(12) United States Patent
Wang

(10) Patent No.: US 6,754,646 B1
(45) Date of Patent: Jun. 22, 2004

(54) OPTICAL PULSE-COUPLED ARTIFICIAL NEURONS

(76) Inventor: Ruibo Wang, 5717 Encina Rd., #205, Goleta, CA (US) 93117

( * ) Notice: Subject to any disclaimer, the term of this patent is extended or adjusted under 35 U.S.C. 154(b) by 459 days.

(21) Appl. No.: 09/963,971

(22) Filed: Sep. 25, 2001

(51) Int. Cl.⁷ ................................................ G06E 1/00
(52) U.S. Cl. ........................................................ 706/40
(58) Field of Search .......................................... 706/40

(56) References Cited

U.S. PATENT DOCUMENTS

| | | | | |
|---|---|---|---|---|
| 5,099,114 A | * | 3/1992 | Matsumoto | 250/226 |
| 5,684,586 A | * | 11/1997 | Fortenberry et al. | 356/450 |
| 6,301,385 B1 | * | 10/2001 | Chen et al. | 382/173 |
| 2003/0050544 A1 | * | 3/2003 | Routt et al. | 600/318 |

* cited by examiner

Primary Examiner—George B. Davis
(74) Attorney, Agent, or Firm—Michael G. Petit

(57) ABSTRACT

The present invention discloses low noise, optically coupled optoelectronic and all-optical artificial neuron devices that can be configured in an array to simulate the function of biological neural networks, and methods for making the artificial neurons. In a first optoelectronic embodiment, the device employs the regenerative pulsation property of astable multivibrators as optical pulse generators. A photo-sensitive detector, disposed in a circuit to control the state of an astable or bistable multivibrator, converts the intensity of the input light into a train of light pulses having a frequency that is a function of the intensity of the input signal. In an all-optical embodiment of an artificial neuron, an input signal is first integrated and the integrated signal transmitted to an optical pulse generator comprised of a nonlinear material disposed within the cavity of a Fabry-Perot etalon. The output of the etalon is a train of light pulses having a frequency that depends upon the intensity of the integrated input signal. When a weak light signal reaches the neuron's input port, there is no light pulse emitted from the output port. By contrast, a strong signal, or a group of weak signals, triggers a short-lived light pulse. The output pulse frequency is a function of the summed input signal power.

13 Claims, 6 Drawing Sheets

R1, R2, R3: Resistor
C1, C2: Capacitor
T1, T2: Transistor
PD: Photodetector
LED: Light-emitting diode R1, R2, R3: Resistor      PD: Photodetector
C1, C2: Capacitor         LED: Light-emitting diode
T1, T2: Transistor R1, R2, R3, R4: Resistor   PD: Photodetector
C1, C2: Capacitor
T1, T2: Transistor R1, R2, R3: Resistor  PD: Photodetector
C1, C2: Capacitor     LED: Light-emitting diode
T1, T2: Transistor

US 6,754,646 B1

OPTICAL PULSE-COUPLED ARTIFICIAL NEURONS

ACKNOWLEDEGMENT

This work was supported by the Defense Advanced Research Projects Agency of the U.S. Government under Contract No. DAAH01-99-C-R202. The Government may have certain rights in the invention.

BACKGROUND OF THE INVENTION

1. Field of the Invention

This invention relates to artificial neurons and, more particularly, to pulse coupled optical neurons and a method for making optical pulse-coupled artificial neurons.

2. Prior Art

Although electronic computers are powerful tools for digital computation and information processing, their pattern recognition and image processing capabilities are far from satisfactory. Recently, many new computation architectures have been explored, including pulse-coupled neural networks: that is, a neural network that simulates the neural network found in biological systems. In such neural networks, the inputs to each neuron are weighted and summed. This sum is then compared with a threshold value. If the sum of the neural input signals exceeds the threshold value, a pulse signal will be produced by a pulse generator.

The essential element of most neural networks is the massive number of weighted interconnections used to combine relatively simple processing elements (neurons) together into a useful architecture. In prior art artificial neural network hardware architecture, interconnection among the neurons is realized using wires. The wiring is necessarily complicated when each neuron is connected to a large number of other neurons. The inherent parallelism and interconnection capability of optics make it an attractive means for the implementing the neural network interconnection process.

SUMMARY

It is an object of the invention to provide an artificial neuron operable for receiving an optical input signal having an intensity and providing an optical output signal comprising a sequence of optical pulses having a pulse output frequency that depends on the intensity of the input signal, the artificial neuron comprising: (a) an input signal integrator operable for receiving and summing a plurality of optical input signals to provide an integrated electrical or optical input signal having an integrated signal intensity; and (b) an optical pulse generator operable for receiving said integrated electrical or optical input signal from said input signal integrator and provide optical output pulses having a frequency that is determined by said integrated signal intensity.

It is a further object of the invention to provide an optical neural network comprising a plurality of artificial neurons, each artificial neuron being operable for receiving an optical input signal having an intensity and providing an optical output signal comprising a sequence of optical pulses having a pulse output frequency that depends on said intensity, the artificial neuron further comprising: (a) an input signal integrator operable for receiving and summing a plurality of optical input signals to provide an integrated electrical or optical input signal having an integrated signal intensity; and (b) an optical pulse generator operable for receiving said integrated electrical or optical input signal from said input signal integrator and provide optical output pulses having a frequency that is determined by said integrated signal intensity.

It is still a further object of the invention to provide an artificial neuron adapted for optical communication with other artificial neurons and a method for making an artificial neuron.

It is yet a further object of the invention to provide an artificial neuron comprising an optoelectronic circuit, the artificial neuron comprising an optoelectronic circuit being adapted to be coupled with other similar artificial neurons by means of optical pulses.

It is another object of the invention to provide an artificial, all-optical neuron comprising a nonlinear Fabry-Perot etalon, the all-optical artificial neuron being adapted to be coupled with similar artificial neurons by means of optical pulses, and a method for making an all-optical artificial neuron.

It is another object of the invention to provide an artificial neuron network comprising an optically coupled array of artificial neurons adapted for applications in neural networks and/or image processing devices.

The features of the invention believed to be novel are set forth with particularity in the appended claims. However the invention itself, both as to organization and method of operation, together with further objects and advantages thereof may be best understood by reference to the following description taken in conjunction with the accompanying drawings in which:

BRIEF DESCRIPTION OF THE DRAWINGS

FIG. 10 is a cross-sectional view of a further embodiment of an optical pulse generator wherein a special light modulator comprising a sheet of a photosensitive material is disposed on one side of a nonlinear Fabry-Perot etalon such as the configuration shown in FIG. 9a.

DESCRIPTION OF THE PREFERRED EMBODIMENTS

Figure 1:
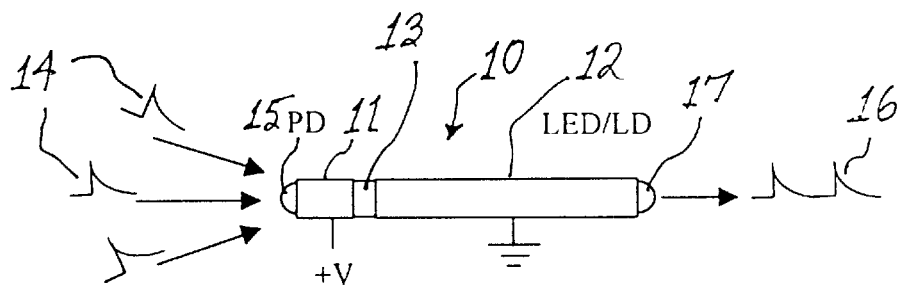
FIG. 1 is a plan view of an optoelectronic embodiment of an artificial neuron in accordance with a first embodiment of the present invention.
Figure 2:
FIG. 2 illustrates the relationship between the pulse frequency and waveform of the output signal of the optoelectronic neuron of FIG. 1 in response to a change in the intensity of an input signal.

Turning now to FIG. 1, an optoelectronic artificial neuron 10 is an astable circuit contained in two conductive tubes 11 and 12. The conductive tubes 11 and 12 are joined with a nonconductive member 13. The conductive tubes are connected to a power supply (not shown) having a voltage output of +V. When a number of such neurons 10 are interconnected by a common conductive medium, as, for example, by stacking, they can share the same single power supply lines. Input signals 14 from an external source are collected by a photodetector 15. The output pulses comprising the output signal 16 of the neuron 10 are provided by a light-emitting diode (LED) 17, or a laser diode (LD). In the output signal 16 of the optoelectronic neuron 10, the pulsation frequency is dependent on the light energy collected by the photodetector 15. An example of the input and output pulse waveform is illustrated in FIG. 2.

Figure 3:
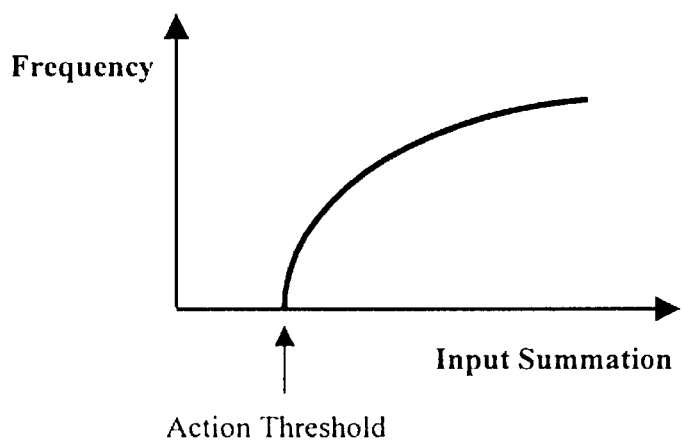
FIG. 3 is a graph illustrating the relationship between the pulse output frequency of an optoelectronic neuron in accordance with FIG. 1 and the sum of pulse amplitudes of a plurality of optical signals comprising the input signal.

In the optoelectronic neuron 10, the input light signals 14 are summed over space or time. When the sum exceeds a threshold value, an output light pulse 16 will be generated. Every individual output pulse 16 comprising the output signal spikes to the same level as an all-or-nothing event. That is, once the positive-feedback cycle starts, nothing will stop the full amplitude spiking. If the threshold value is not reached, however, the slight increase in the output light intensity will subside when the stimulus is removed. Each output pulse 16 lasts only for a short period of time. The pulse frequency is a function of the input signal summation, either temporally or spatially. FIG. 3 shows the relationship between the output pulse frequency and the summation of the input signals.

Figure 4:
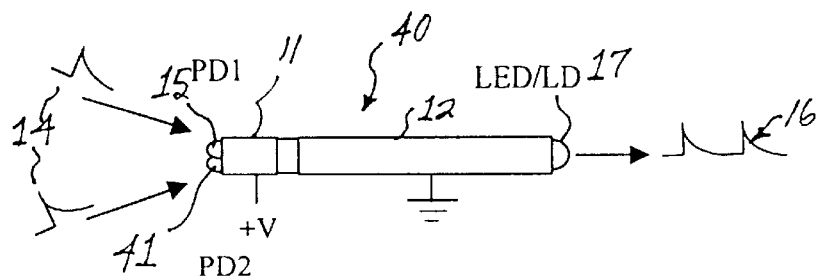
FIG. 4 is a plan view of an embodiment of an optoelectronic neuron in accordance with the present invention wherein the signal input port comprises a pair of photosensitive elements, one of which is stimulatory, and the other inhibitory, in response to an input signal.
Figure 5:
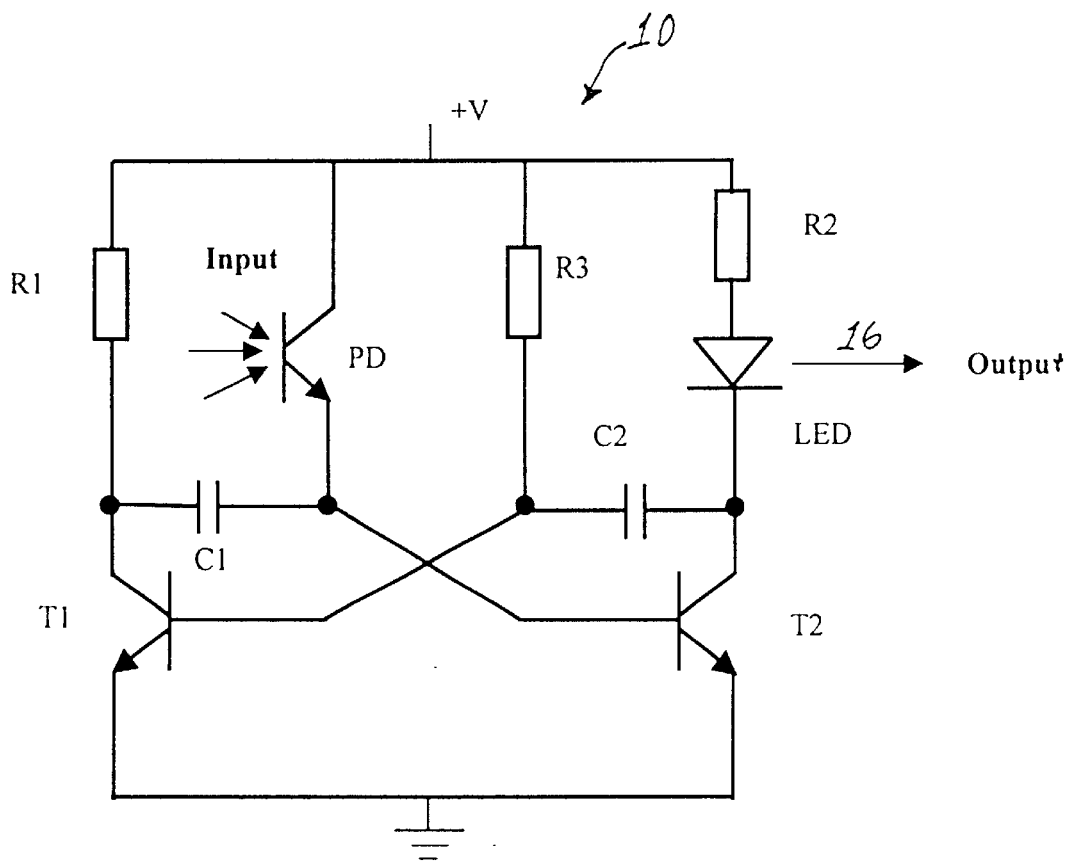
FIG. 5 is a schematic diagram of the optoelectronic embodiment of an artificial neuron shown in FIG. 1 wherein the frequency of optical pulses from an LED disposed in the signal output section of an astable electronic multivibrator is dependent on the intensity of light incident on a photosensitive element disposed to comprise an element in the RC time constant of the signal input section of the circuit.

Neurons in biological neural networks receive information from both excitatory and inhibitory synapses. Accordingly, the optoelectronic neuron 10 can be modified to include both excitatory and inhibitory synapses as illustrated in the artificial optoelectronic neuron shown at 40 in FIG. 4. In the optoelectronic neuron 40, the input port consists of two photodetectors, one photodetector 15 being excitatory, and the other photodetector 41 being inhibitory. Individual neurons 40 decide whether or not to fire an output pulse 16 by summing excitatory and inhibitory inputs. Signals received by the excitatory synapses make the neuron more likely to fire a pulse. Conversely, signals received by the inhibitory synapses render the neuron 40 less likely to fire. An example of a first preferred embodiment of an optoelectronic neuron based on an astable multivibrator is illustrated in FIG. 5. The astable circuit consists of two transistors T1 and T2, two capacitors C1 and C2, three resistors R1, R2 and R3, a photodetector PD, and a light-emitting diode LED. As with the receptor in biological neurons, the photodetector is the input port (i.e., receptor) for the optoelectric neuron 10. The light-emitting diode serves as the output port, emitting signals to be received at the synaptic inputs of neighboring neurons.

Figure 6:
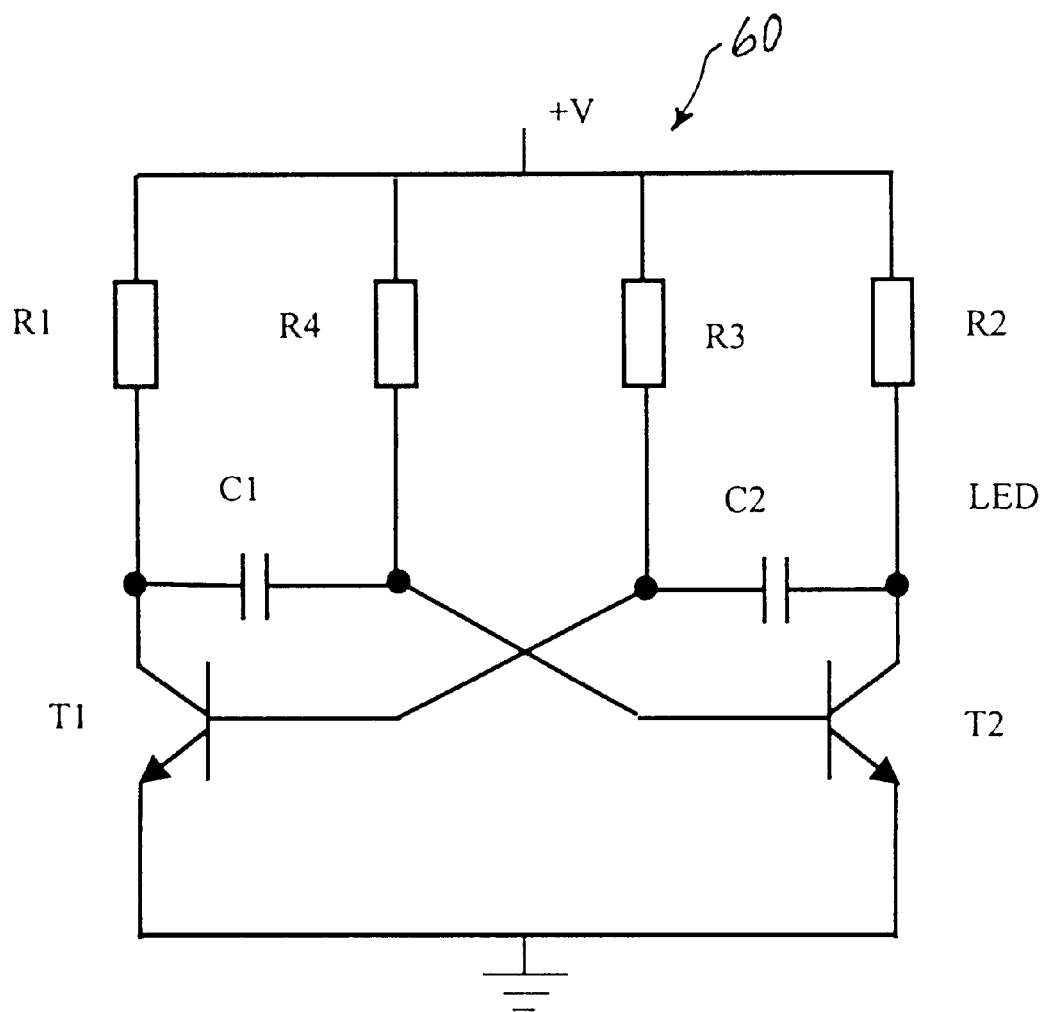
FIG. 6 is a schematic diagram of an astable multivibrator in accordance with FIG. 5, illustrating the operation of such a circuit when the photosensitive elements comprising the RC time constants of the circuit, as shown in FIG. 5, are replaced with fixed resistors.

With reference now to the multivabrator circuit 60 of FIG. 6, if the photodetector PD of FIG. 5, which may be a photosensitive resistor, a photodiode or a photosensitive transistor, is replaced with a resistor R4, then the circuit 60 will act as an ordinary astable multivibrator. Multivibrators are classified according to the number of steady (stable) states of the circuit. A steady state exists when circuit operation is essentially constant; that is, one transistor remains in conduction and the other remains "off" until an external signal is applied. The three types of multivibrators are the astable, monostable, and bistable. The astable circuit has no stable state. With no external signal applied, the transistors alternately switch from cutoff to saturation at a frequency determined by the RC time constants of the coupling circuits. In the circuit 60 illustrated in FIG. 6, durations of the two unstable periods are $T_1 = 0.69 R_4 C_1$
$T_2 = 0.69 R_3 C_2$ The free-running frequency of such a multivibrator is given by $$f = 1/T = 1/(T_1 + T_2) = 1.45/(R_4 C_1 + R_3 C_2).$$

When a photodetector is included in the astable circuit to form an optoelectronic neuron, the oscillation frequency of the multivibrator circuit will be determined primarily by the light energy collected by the photodectector PD. With a continuous wave (CW) light input, output signal pulses 16 are produced if the input power reaches an activation threshold. The frequency of the light pulses emitted from the LED increases with an increase of input light power. With pulsed light input, the frequency of the pulses comprising the output signal 16 increases with the summation of energy contained in each pulse.

Figure 7:
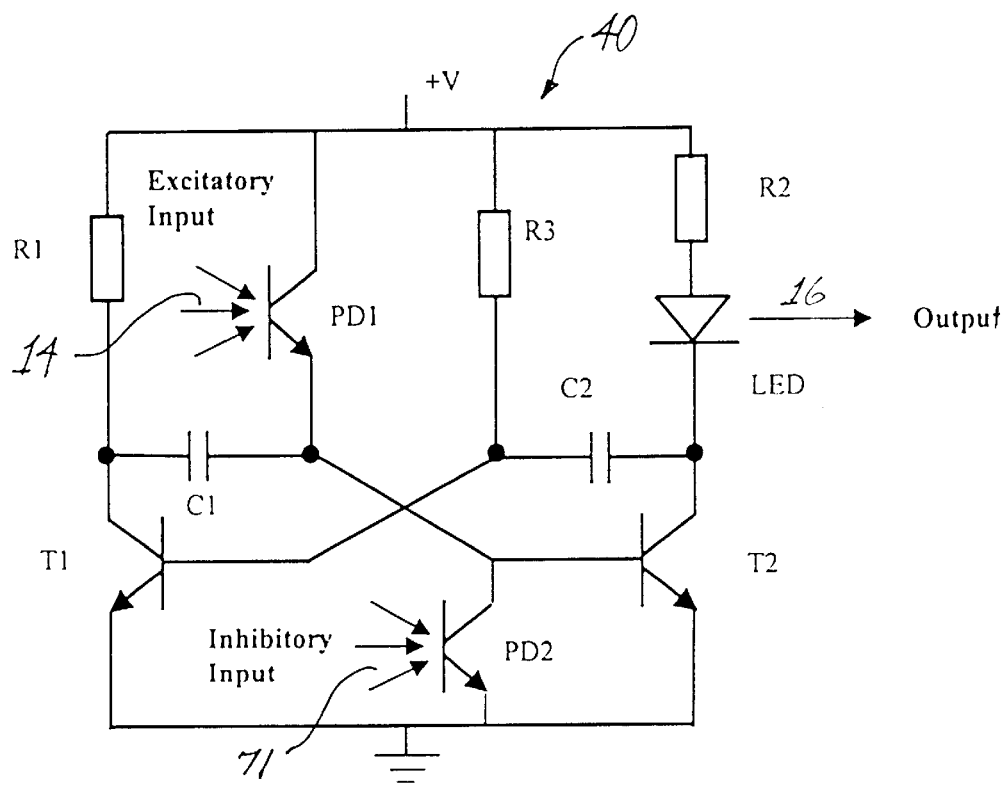
FIG. 7 is a schematic diagram of an optoelectronic neuron comprising an astable multivibrator that is similar to the astable multivibrator of FIG. 5, but wherein a second photosensitive element provides an inhibitory signal to the output LED that depends on the intensity of an inhibitory optical input signal.

FIG. 7 illustrates an optoelectronic neuron 40 containing both excitatory and inhibitory synapses. Input signals 14 collected by photodetector PD1 can increase the output signal 16 pulsation frequency. On the other hand, inhibitory input signals 71, detected by PD2, can reduce the output signal pulsation frequency.

Figure 8:
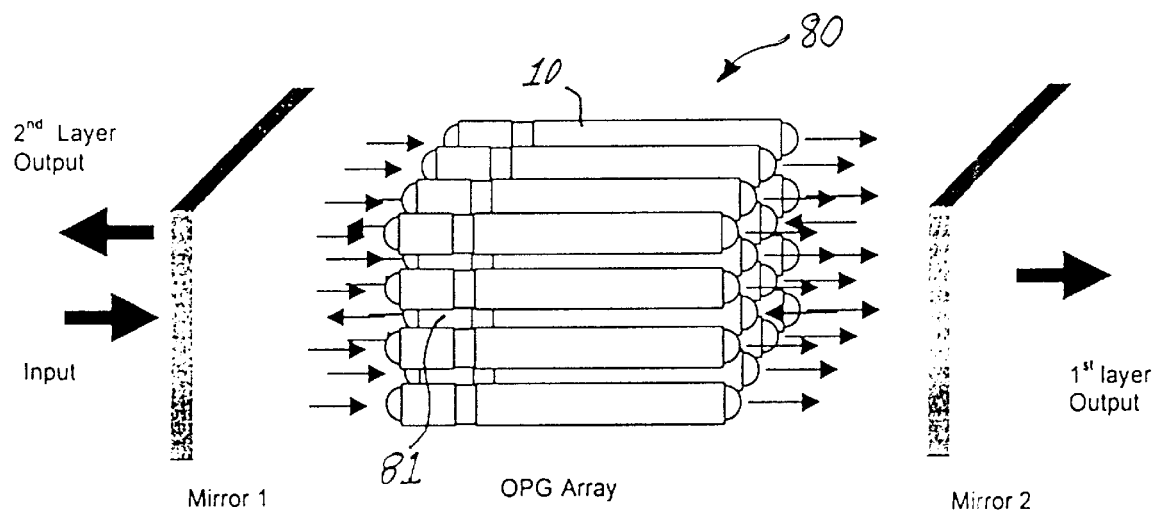
FIG. 8 is a perspective view of a two layer device comprised of a pulse coupled artificial neuron network employing an array of forward and rearward directed optoelectronic neurons, as shown in FIG. 1, disposed between two parallel mirrors.

By using a plurality of the optoelectronic neurons 10, shown in FIG. 1, a two-layer system can be assembled to simulate a neural network 80 as illustrated in FIG. 8. Forward oriented neurons 10 form the first layer, and some backward oriented neurons 81 in the assembly form the second layer. The input signal of a neuron 81 in the second layer is the light signal reflected from the partially reflective mirror 2, which light signal originated from its neighboring neurons 10 in the first layer. In this 2-layer system 80, synchronization and momental contrast enhancement can be performed. When uniformly distributed light intensity is projected to the input end of the first layer, all the neurons are synchronized and pulse periodically. When neurons in different areas are simultaneously exposed to light intensity at different levels, the neurons will pulse in groups.

3. All-Optical Neuron

The objectives of the present invention can also be met by all-optical artificial neurons. All-optical neurons can be constructed by advantageously using the regenerative pulsations in optical bistable devices. Regenerative pulsation in optical bistable devices is a suitable mechanism for realization of optical neurons due to the following properties:
1. The pulsation has a distinctive threshold.
2. By using proper nonlinear materials, the pulsation frequency can be increased by increasing of the power of the excitation light.
3. Occurrence of regenerative pulsation in optical bistable devices have favorable switching and memory properties.

Regenerative pulsation in optical bistable devices is an optical phenomenon, first observed by McCall, using a hybrid optical device (S. L. McCall, "Instability and regenerative pulsation phenomena in Fabry-Perot nonlinear optic media devices," Appl. Phys. Lett., Vol. 32, 284(1978)). Regenerative pulsation can also take place in an all-optical bistable device, when the nonlinearity had two contributions of opposite sign and different time constants. When regenerative pulsation takes place, the bistable device turns into an astable device. As of the present date, this phenomenon has only been observed in several bistable devices using nonlinear materials such as GaAs, InSb, ZnS and liquid crystals. In these prior art devices, the pulsation frequency is relatively stable, but not dependent on the incident light intensity as desired for constructing optical neurons. Accordingly, these materials are not suitable candidates for all-optical neuron applications at the present time. For optical neuron applications, the nonlinear material needs to have a response time constant that varies with the light intensity of light incident thereon. In certain materials, such as dye-doped liquid crystals and photorefractive crystals, the nonlinear response time constants are sensitive to the light intensity and these materials are, therefore suitable for building optical neurons.

The pulse coupled, all-optical neuron in accordance with the present invention consists two elements: an input signal integrator and a bistable device, the latter being a pulse generator. The function of the integrator is to sum the input light pulses, and transmit a continuous wave light beam, the intensity of the CW beam fluctuating with the summation of the input signals. The greater the number of input signals the integrator receives, the higher the intensity of the CW beam it transmits to the pulse generator. An example of an integrator suitable for use in an optical neuron application is a spatial light modulator comprising liquid crystals. The readout light intensity of such a spatial light modulator is a function of the incident light signal energies, with a response speed determined by the frequency of the LC driver.

The pulse generator is a key element in the all-optical neuron of the present invention. The function of the pulse generator is to generate a train of pulses having a frequency that varies with the light intensity it receives from the integrator. In the preferred embodiment of the present invention, the pulse generator is actually a nonlinear Fabry-Perot etalon. The optical behavior of the nonlinear medium contained in the etalon cavity generally depends on two nonlinear mechanisms. One mechanism tends to turn the device "on" at higher input light intensities, while the other (slower) mechanism tends to turn the device "off".

An example of a nonlinear medium that can be adapted for disposition within the cavity of a Fabry-Perot etalon is a dye-doped liquid crystal, which has both a large thermo-optic coefficient and large orientational nonlinearity. When the light intensity incident upon the liquid crystal is higher than the activation threshold of the dye-doped liquid crystal, thermal effects result in a change in the index of refraction of the medium, which can turn the device "on" automatically. When the device is turned "on", the light intensity build-up inside the etalon cavity triggers the orientational nonlinearity, which will turn the device "off". After the device is turned "off", the thermal effect will again dominate and the device turns "on". Under a constant incident power, this on-and-off process is continuous, and the etalon mirror transmits a train of pulse with a fixed frequency. When the incident power changes, the response time constants in the dye-doped liquid crystal changes, which induces a change in the pulsation frequency.

When designing a pulse generator for use in an optical neuron for practical applications, the contrast ratio of the device is preferably maximized. The Fabry-Perot is basically a simple interferometer relying on the interference of multiply reflected beams. The simplest Fabry-Perot etalon consists of a pair of parallel mirrors. The incident beam of light undergoes multiple reflections between two parallel mirrors that define the cavity. In a Fabry-Perot etalon containing a nonlinear material within the cavity, the transmission of light by the etalon is governed by:

$$T = \frac{T_0}{1 + F \sin^2(\theta)} \quad (1)$$

$$F = \frac{4RD}{(1-RD)^2} \quad (2)$$

$$T_0 = \frac{D(1-R)^2}{(1-RD)^2} \quad (3)$$

$$D = \exp(-\alpha L - \beta L) \quad (4)$$

$$\theta = \frac{2\pi n L}{\lambda} + \theta'_o \quad (5)$$

where $\theta$ is the single-trip phase shift of the cavity, R is the reflectivity of the mirrors, $T_0$ is the peak transmission of the filter, $\alpha$ is the absorption coefficient of the material, $\beta$ is the scattering coefficient, L is the etalon cavity length, $\lambda$ is the light wavelength, and $\theta'_o$ is a constant. The transmission peaks at $\theta=0, \pi, 2\pi, \ldots n\pi$, can be made very sharp in a low loss cavity ($\alpha \approx \beta \approx 0$) by increasing the reflectivities of the mirror surfaces.

In the Fabry-Perot, when a dye-doped liquid crystal is disposed within the cavity, the cavity loss is due to two main factors: (a) absorption by the dye molecules; and (b) scattering by the liquid crystal molecules. From the equations shown above, the contrast ratio of the device in the "on" and "off" states is $$\Delta = 1 + F$$

In order to obtain a high F factor, a medium with low absorption and scattering is preferred. Since the photosensitivity of the material is dependent on the concentration of the doped dye, which can not be too low, the only way to enhance the F factor is to lower the scattering loss of the liquid crystal. When the liquid crystal molecules are well aligned in the cavity, high contrast ratio can be achieved. The use of vacuum deposited dielectric films as an alignment layer is a common practice. In experiments, it has been found that some dielectric mirrors may also be used as the alignment layers. In the film deposition process, if the substrate is tilted an angle to the evaporation source, the molecular orientation within the film will have a determined direction, which may be used to align the liquid crystal molecules.

Figure 9A:
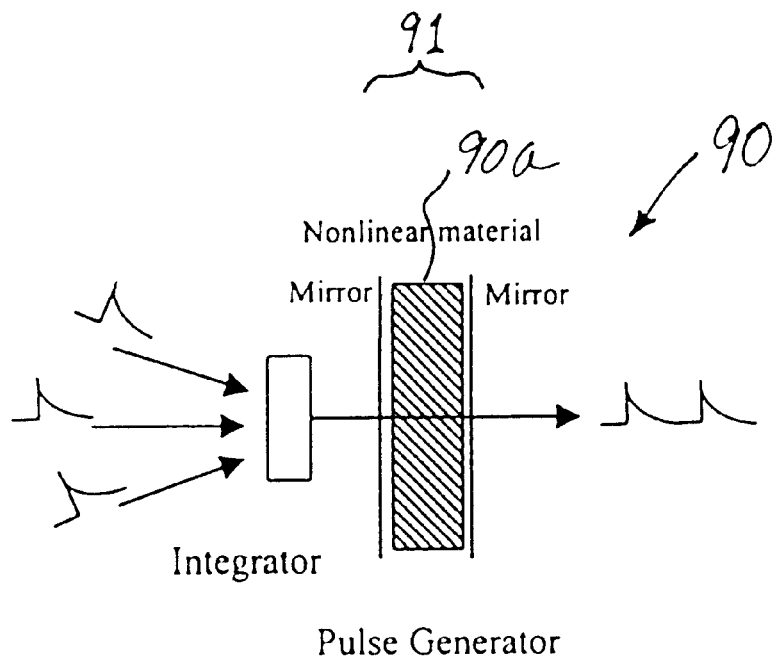
FIG. 9a is a cross-sectional view of an optical pulse generator employing a nonlinear optical material disposed between two parallel mirrors that receives and sums a plurality of optical signal input pulses and generates a pulsed output signal having a pulse frequency that depends on the sum of the input signals.
Figure 9B:
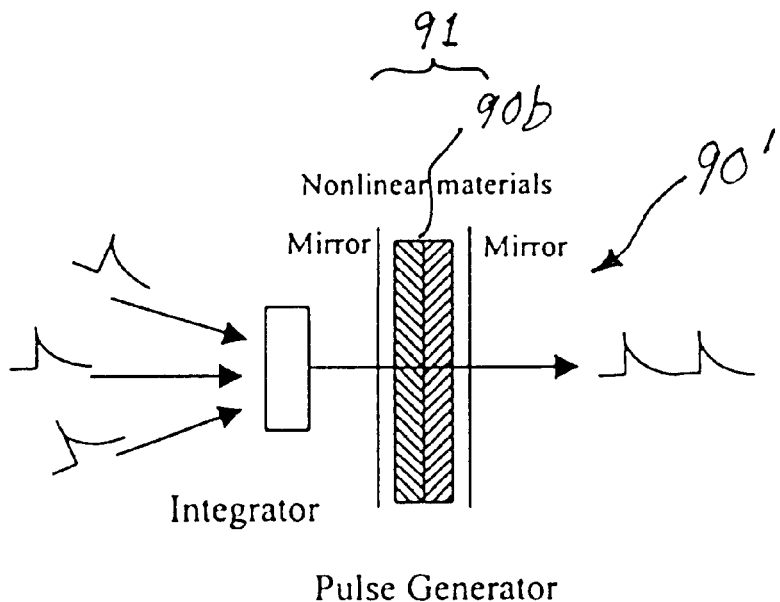
FIG. 9b is a cross-sectional view of another embodiment of an optical pulse generator employing two nonlinear optical materials disposed between parallel mirrors to form a nonlinear Fabry-Perot etalon, as shown in FIG. 9a. The device receives and sums a plurality of optical signal input pulses and generates a pulsed output signal having a pulse frequency that depends on the sum of the input signals.

Just as the nonlinear Fabry-Perot etalon 91 containing a medium 90a having two nonlinear mechanisms, shown in the optical neuron 90 of FIG. 9a, regenerative pulsation can also take place in a nonlinear Fabry-Perot etalon when the etalon has two layers of nonlinear materials 90b disposed in the cavity, as illustrated in FIG. 9b. The structure of the optical pulse generator 90' is more advantageous than the optical pulse generator 90 because of the greater flexibility in the selection of the nonlinear materials 90b disposed in the cavity of the etalon 91. If only one material with two nonlinear mechanisms is used, such as indicated at 90a in FIG. 9a, the response properties of the mechanisms are usually fixed.

In a Fabry-Perot etalon 91 containing two nonlinear materials 90b within the cavity thereof, the transmission of the etalon is governed by the following equations.

$$\tau_1 \frac{d\theta}{dt} + \theta = aP_0 \quad (1)$$

$$\tau_2 \frac{d\phi}{dt} + \phi = arP_0 \quad (2)$$

$$P_0 = P_i T(\theta, \phi) = \frac{P_i}{1 + F\sin^2(\theta + \phi)} \quad (3)$$

where $\theta$ and $\phi$ are the phase shifts of light in the two materials, $P_i$, $P_0$ are incident and transmitted light power, $\tau_1$, $\tau_2$ are the response time constants of the two nonlinear materials, $\alpha$, r are the nonlinear coefficients. One can obtain the pulsation condition for the system, $$1 + \frac{\tau_1}{\tau_2} < aP_i\left(T'_0 + rT'_\phi \frac{\tau_1}{\tau_2}\right) \quad (4)$$

$$T'_0 = \frac{\partial T}{\partial \theta}\bigg|_{\theta_0, \phi_0} \quad (5)$$

$$T'_\phi = \frac{\partial T}{\partial \phi}\bigg|_{\theta_0, \phi_0} \quad (6)$$

$\theta_0$ and $\phi_0$ are the phase shifts under steady state, $$\theta_0 = aP_i T(\theta_0, \phi_0) \quad (7)$$

$$\phi_0 = r\theta_0 \quad (8)$$

When Equation (4) is satisfied, the nonlinear Fabry-Perot etalon turns from a bistable device into an astable device. By employing proper nonlinear materials that have time constants related to the irradiance, the pulsation frequency can be a function of the incident intensity, satisfying the requirements for optical neuron operations.

Figure 10:
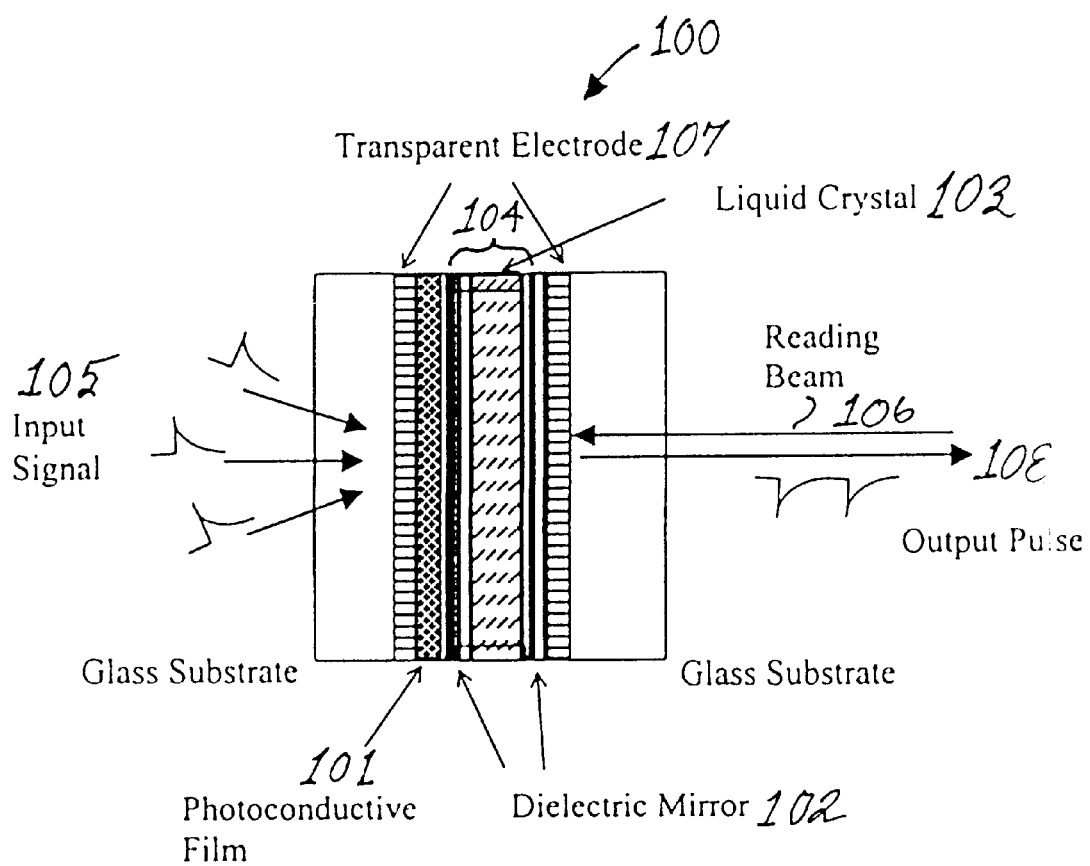

In order to make the nonlinear material more sensitive to incident light, a spatial light modulator can be combined with a nonlinear Fabry-Perot etalon. FIG. 10 shows such an all-optical neuron 100 having a laminate structure. The optical neuron 100 consists of a photoconductive layer 101 such as, for example, a layer of amorphous silicon, a pair of dielectric mirrors 102, and a liquid crystal layer 103. The mirrors 102 and the liquid crystal layer 103 form a nonlinear Fabry-Perot etalon 104. In the state where no input signal 105 is incident on the device 100, and no reading light 106 reaches the photoconductive layer 101 by passing through the Fabry-Perot in a right to left direction, the impedance of the photoconductive layer 101 is extremely high. When an AC voltage is applied onto the transparent electrode layers 107, the electric field in the liquid crystal layer, which field is dependent on the intensity of light reaching either side of the photoconductive layer 101, induces a phase change in the liquid crystal. The nonlinear Fabry-Perot etalon 104 can be switched from the reflection state to the transmission state as a result of the phase change in the liquid crystal layer 103. In the transmission state, the light intensity inside cavity may trigger nonlinearity due to the thermal effect and/or orientational effects inside the Fabry-Perot etalon, and switch the Fabry-Perot etalon from transmission state back to reflection state. This process continues ad infinitum, with a frequency depending on the intensity of the incident light signal. The shape of output pulses 108 produced by optical neuron 100 is opposite to the shape of the input pulses 105. Accordingly, a converter such as a special light modulator is needed to transform the waveform.

In addition to potential applications in pulse coupled neural networks, both the optoelectronic neurons 10 and 40 and all-optical neurons 90 and 100 may also be used as optical analog-to-digital converters. A large scale network can be constructed using an array 80 of such neurons as indicated in FIG. 8. Interconnection among these neurons can be performed with off-the-shelf optical components such as mirrors, lenses, gratings and optical fibers.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

I claim:

1. An artificial neuron operable for receiving an optical input signal having an intensity and providing an optical output signal comprising a sequence of optical pulses having a pulse output frequency that depends on the intensity of the input signal, the artificial neuron comprising: (a) an input signal integrator operable for summing a plurality of optical input signals to provide an integrated electrical or optical input signal having an integrated signal intensity; and (b) an optical pulse generator operable for receiving said integrated electrical or optical input signal from said input signal integrator and provide optical output pulses having a frequency that is determined by said integrated signal intensity.

2. The artificial neuron in accordance with claim 1 wherein said input signal integrator is a photosensitive element.

3. The artificial neuron in accordance with claim 2 wherein said photosensitive element is a resistor.

4. The artificial neuron in accordance with claim 2 wherein said photosensitive element is a photosensitive diode.

5. The artificial neuron in accordance with claim 2 wherein said photosensitive element is a photosensitive transistor.

6. An artificial neuron in accordance with claim 2 wherein said optical pulse generator is an astable multivibrator comprising a photoemissive device having an optical pulse output frequency that depends upon said integrated signal intensity.

7. An artificial neuron in accordance with claim 1 wherein said optical pulse generator comprises a nonlinear Fabry-Perot etalon.

8. An artificial neuron in accordance with claim 7 wherein said nonlinear Fabry-Perot etalon comprises a dye-doped liquid crystal layer disposed between two parallel, partially reflecting mirrors.

9. An artificial neuron in accordance with claim 8 further comprising a second layer of nonlinear optical material disposed between said two parallel, partially reflecting mirrors.

10. An artificial neuron in accordance with claim 9 wherein said Fabry-Perot etalon is disposed between a pair of optically transparent electrodes.

11. An artificial neuron in accordance with claim 8 wherein said Fabry-Perot etalon is disposed between a pair of optically transparent electrodes.

12. An optical neural network comprising a plurality of artificial neurons, each artificial neuron being operable for receiving an optical input signal having an intensity and providing an optical output signal comprising a sequence of optical pulses having a pulse output frequency that depends on said intensity, the artificial neuron further comprising: (a) an input signal integrator operable for receiving and summing a plurality of optical input signals to provide an integrated electrical or optical input signal having an integrated signal intensity; and (b) an optical pulse generator operable for receiving said integrated electrical or optical input signal from said input signal integrator and provide optical output pulses having a frequency that is determined by said integrated signal intensity.

13. An optical neural network comprising a plurality of artificial neurons in accordance with claim 12, further comprising reflective means operable for reflecting at least a portion of said optical output pulses to provide reflected optical output pulses and directing at least a portion of said reflected optical output pulses to be received by said input signal generator of at least one optical neuron comprising said optical neuron network.

* * * * *